3,158,135
METHOD FOR RAISING BASS AND FROGS
Howard J. Kimmerle, 5602 Long Beach Blvd.,
Long Beach, Calif.
No Drawing. Filed Mar. 21, 1962, Ser. No. 181,465
7 Claims. (Cl. 119—3)

This invention relates to a new method of propagating fresh water bass and frogs.

Many attempts have been made to propagate bass and frogs in sufficient size and numbers to qualify as a commercial crop or product. Some attempts have failed due to the fact that both bass and frogs are ferae naturae and cannibalism is one of their strongest propensities. Other attempts have failed due to the fact that inorganic fertilizers were used, which resulted in the good growth of vegetation in the pond, but poor Daphnia and bacteria growth, which is the fundamental food for the propagation of fingerling bass and for other bass food. Another reason is due to the inability to raise minnows and other bass food economically.

Limited success has been attained in the rearing of small, immature or fingerling bass, that is, bass up to two or three inches in length. Such bass, due to their small size, live on small, often microscopic animal life in the waters in which they are reared. Being much too small for human consumption, fingerling bass are used exclusively for stocking lakes and ponds, where it is hoped they will continue to grow and thrive until they reach a size which is suitable for human needs.

As soon as young bass reach a length of about one and one-half inches they start to eat larger animals found in the water. Further, and more important, they start to practice cannibalism. It is at this stage of development that prior attempts to raise bass commercially have failed. These failures have been due to the inability to provide sufficient quantities of the necessary food for the bass at a practical or feasible cost, and the strong cannibalistic characteristics of bass.

It has been found that while bass will eat practically anything, a large bass will eat a smaller bass in preference to less easibly obtainable food, such as tadpoles and minnows, which are small and frequently hidden.

It has also been found that in any group of bass, the smaller bass are constantly on the defensive from and are frightened by the larger bass, and as a result the smaller bass do not feed as well and do not grow as rapidly. The larger bass, feeding on the smaller bass, grow well. The result of this is that the larger bass devour the smaller bass at a rate that makes commercial raising of bass impractical. In repeated experiments an average of 2,000 bass were placed in small ponds and hand fed to assure adequate feeding, yet at the end of a year an average of only six survived, due to cannibalism.

The method of raising bass that I provide involves separating and grading young bass, when necessary, so that the size differential of all the bass in each group or batch of graded bass is such that cannibalism cannot be readily practiced.

A further feature of my new method involves the propagating of tadpoles, mosquito fish, and other minnows in separate ponds for feeding the growing bass.

Yet another feature of my new method of raising bass is to fertilize the water in rearing ponds for bass to induce the rapid development and growth of diatomes and bacteria to feed and induce the rapid growth and the development of Daphnia and midges on which small bass planted in the ponds can feed and grow.

My new method also has to do with the growing of mosquito fish and other minnows, crawfish and tadpoles in rearing ponds, which creatures will not be consumed by the small bass or by each other, but can be harvested and used to feed the mature bass placed in the growing ponds.

Frogs are similar to bass in that they are cannibalistic and eat only animal and insect life. As tadpoles, before and during metamorphosis, their diet is vegetable. As a result, the raising of frogs as a commercial food product can be achieved by following somewhat the same method that I provide for raising bass.

The object of my invention is to provide a novel, highly effective, dependable and economical method for raising bass and/or frogs.

The various objects and features of my invention will be fully understood from the following detailed description of a typical preferred manner of carrying out the method of my invention:

The method of raising bass that I provide involves, first, the establishment of a plurality of ponds. The several ponds provided include one or more rearing ponds in which there are only Daphnia for newly hatched bass, and other ponds in which food for larger bass is propagated. The ponds further include a plurality of growing ponds in which mature bass are placed, that is, bass which have grown beyond the fingerling stage.

In practice, the rearing ponds for the newly hatched bass can be smaller than the growing ponds, as the smaller animal life grown therein, as food for the newly hatched bass, do not have cannibalistic tendencies, require the same food and growing conditions, and can survive and thrive in heavy concentration. Separate rearing ponds should be provided for the young or fingerling bass and the bass food, that is, minnows and tadpoles.

The growing ponds, in which the mature bass are placed, must be of sufficient size to accommodate the larger fish and provide sufficient room for the fish to swim and move about in search of food. This is necessary since bass, being ferae naturae cannot be too crowded, but must be free to seek out their own food, even though such food is provided for them in abundance.

The rearing ponds must be established and stocked with food for the newly hatched or fingerling bass before the bass are hatched.

Fingerling bass as well as newly hatched bass diet on Daphnia which, in turn, diet on diatomes and bacteria. Diatomes and bacteria live on dead and/or decayed organic matter of all kinds.

These creatures are all more or less dormant in the winter when the waters are cold, but increase rapidly in the spring when the temperature of the waters rises to a certain point. This temperature point is not constant, but varies according to light, weather, changes in the organic matter in the water, and other conditions. By heating and controlling the temperature of the water by means of a suitable heater in the rearing ponds, and by proper fertilization and/or aeration, and by visual observation, a year-round supply or crop of diatomes and bacteria, and, as a result a year-round supply of Daphnia as feed for bass and as feed for mosquito fish and other minnows, which are natural food for bass, can be assured.

The stocking of rearing ponds with Daphnia, diatomes and bacteria presents no problem, as the eggs of these creatures are present in most all soil. Accordingly, the soil defining the ponds will have in it the eggs necessary to develop and produce these creatures.

The diatome and bacteria count of the water in the rearing ponds is increased by fertilizing the ponds with organic matter such as chicken feed, cotton seed meal, fish meal, hay, sticks, and other available animal and vegetable matter. In some waters inorganic fertilizer may be used to advantage to improvise vegetable growth in the ponds, but it is not suitable, by itself, for the development and growth of bacteria and diatomes.

Should the bacteria count become too high and/or the dissolved oxygen in the water too low, the water will become sour or toxic. It can be sweetened or corrected by aerating or oxidizing the water, as by scrubbing which is the inducing of a jet of air through the water, or any other suitable means of aeration or oxidization such as the cultivated growth of algae.

In practice, sewage effluent ponds, and the like, which are ordinarily toxic, may be used as rearing ponds if properly oxidized.

As regards Daphnia, which is the natural food for newly hatched and fingerling bass, and the natural food for minnows, which, in turn, are the natural food of bass, there are in excess of 100 varieties or kinds, and hundreds of their eggs are present in every shovelfull of soil. One Daphnia (Daphnia pulex) provides a brood of eggs every two or three days, and with its descendants may produce in excess of 13 billion animals within 60 days. One cubic foot of organically fertilized and aerated water will contain in excess of 20,000 Daphnia and produce 5,000 per day. A one inch bass will eat about 2,000 of these creatures each day.

With the rearing ponds thus stocked with food for the newly hatched bass, newly hatched bass are rounded up and deposited in the rearing ponds.

The round-up of newly hatched bass is a well known art and is easy to perform. Bass spawn in the spring. Their spawning nests can be located by observation, as the male bass can be observed fanning and rooting out a depression or nest in the bottom of the lake or pond in which the fish lives.

He is often assisted or aided by one or more female bass. After the nest is prepared and the eggs are laid, which operation may take several days, the male bass remains on guard and fans the nest until the young bass are hatched. The male maintains the young bass in a herd, in close proximity to the nest for a considerable period of time, and will, if left unattended, eat the greater part of the herd. Each nest will yield from about 2,000 to about 5,000 young bass.

As soon as the young bass rise from the nest, a person can, by using a screen or other suitable instrument, easily herd them into a submerged bucket. A 3 gallon bucket can catch and hold from 2,000 to 3,000 young, newly hatched bass at one time.

The newly hatched bass, thus collected, are placed in the prepared rearing ponds and will grow about one inch a month. Some will grow faster than others, and the larger ones will start eating the smaller ones as soon as they can. Accordingly, the larger bass must be separated from the smaller bass and placed in separate growing ponds where, if properly fed, they will continue to grow. As the young bass continue to grow in the growing ponds, some will grow faster than others, and separation and grading will again become necessary to prevent cannibalism. This grading and separating operation may need to be performed two or three times the first season. The frequency of grading and separating the bass is greatly controlled by the size of the ponds in which they are placed, and the number of Daphnia compared to the number of bass, as the more crowded they are, the more food they need.

After the first season, while the rate of growth of the bass does not vary greatly, cannibilism is less, and separating and grading is required less frequently. A bass will easily eat another bass about one third his length, but will not try to eat one-half his length.

Feed for the mature bass in the growing ponds may be raised in rearing ponds, separate from or with the newly hatched bass, as desired, and consists of mosquito fish and other minnows, tadpoles and crawfish, all of which are natural food for bass and all of which feed on Daphnia and/or organic matter present in the rearing ponds.

Tadpoles and crawfish are scavengers and live on any and all sources of organic matter, while mosquito fish and other minnows live on Daphnia and some organic matter. Further, all of the above creatures survive under the same conditions or environment. As a result, these natural foods for bass can be grown in the same rearing ponds, but should also be grown in separate stocking ponds to keep the supply from being exhausted.

In addition to the foregoing creatures, worms, maggots and flies are natural food for bass and frogs and can be easily and economically grown.

Mosquito fish and other minnows do not multiply too rapidly, and as a result a large stock must be kept in separate ponds.

Crawfish, like minnows, do not multiply too rapidly, and as a result must be well stocked.

Further, large crawfish are suitable as food for the larger bass and frogs and, as a result, are needed in large quantities.

Minnows and crawfish are necessary food sources and their importance is not to be overlooked, as their inclusion in the diet for the bass and frogs enhances the flavor of the bass and frogs and also provides a variety of food upon which they will feed, thereby keeping the bass and frogs alert and active.

Tadpoles are easily grown in large quantities, are an excellent bass and frog food, and in carrying out the present invention, provide an important item in the diet for the bass and frogs.

Frogs, that is, jumbo frogs, or Rana Catesbiana, which are considered a delicacy by many persons, spawn in May or June. Each pair of frogs will lay a cluster of eggs that will produce up to 15,000 tadpoles. The spawn of one pair of frogs will produce, if properly attended and fed, in excess of one ton of tadpoles in 3 months.

Tadpoles thrive on the same chicken feed and other organic food used to fertilize the rearing ponds and to feed the diatomes, bacteria, Daphnia and minnows.

By capturing several pairs of frogs, or by collecting the eggs clusters of free frogs, which is an extremely easy task, a more than abundant food supply for the mature bass and frogs is assured.

It is estimated that tadpoles can be raised commercially for less than $5.00 worth of food per ton. As a result they are a prime food source in the commercial raising of bass and frogs.

The minnows, crawfish and tadpoles are transferred in any suitable manner from the rearing ponds to the growing ponds, as required. Since the feeding habits of bass are not regular, the frequency and quantity of food provided must be determined from observation. When a growing pond appears to be substantially depleted of natural foods, it is an indication that the supply should be increased or replenished.

For best results, in flavor, texture and growth, bass and frogs should be kept well fed, that is, they should be maintained with an abundance of natural food.

Bass can be trained to eat ground horsemeat or the like, cast onto the surface of the pond. Accordingly, ground meat can be made a good dietary supplement.

It is to be noted that in addition to tadpoles, frogs are also a natural food for bass, as well as being a good commercial produce for human consumption. Accordingly, as circumstances require, or as desired, frogs can be produced as food for the growing bass or produced for human consumption from the tadpoles in the rearing ponds. This may be speeded up by forced metamorphosis, that is forcing the tadpoles to change into frogs.

Ordinarily, metamorphosis will not occur for two years, if the water and food supply for tadpoles is maintained adequate. However, as soon as the environment becomes too crowded and unsuitable for tadpoles, metamorphosis takes place, and the water-breathing tadpoles become frogs, or air breathing creatures, and change also from herbivori to carnivori.

Accordingly, to force metamorphosis it is only necessary to transplant the tadpoles into a small puddle or a pond with inadequate food and/or inadequate water.

When the frogs emerge from their tadpole state, the tail is absorbed and they start to feed on living creatures such as minnows, worms, flies, and the like. Further, and more significant, they thrive on tadpoles, if they can swallow them.

Accordingly the frogs forced through metamorphosis can be fed on the same food provided for the bass.

Since frogs are also cannibalistic, and since they are nomadic, they must be systematically graded and separated as to size in the same manner as the bass, to prevent cannibalism, and must also be maintained in fenced or screened-in areas.

Since frogs are amphibians, the ponds in which they are received must be provided with shallow water in places, where they can catch minnows and tadpoles. Accordingly, special frog-growing ponds, which are constructed differently from those provided for the bass, should be provided.

As the frogs are needed for bass feed, they can be transplanted from the frog-rearing and/or metamorphosis ponds to the growing ponds for the bass.

As regards the other supplements to the diet for the bass, and also for the frogs, that is, earthworms, flies and maggots, worms can be raised in trenches filled with cow manure in banks or dikes establishing the growing ponds. Flies and maggots can be provided and raised in sufficient quantities by deposits of poultry entrails and the like, placed in boxes positioned over the banks of the ponds. By placing the entrails or animal waste in the above-mentioned boxes, a quantity of maggots will inevitably drop onto the banks and crawl into the water, whereupon the bass and frogs can feed on them.

The novel features of the foregoing method for commercial raising of bass consists, first, in establishing and fertilizing and/or oxidizing the water in the rearing ponds with organic material and controlling the temperature of the water to induce the development and growth of diatomes and bacteria, and the resulting development and growth of Daphnia and midges. Then, stocking pond or ponds with minnows and tadpoles. The rearing ponds being thus established and stocked, the next step in carrying out my method is to collect and deposit newly hatched bass in the rearing ponds to feed and grow on the Daphnia and midges. The next step of my method is to separate and grade the bass when necessary to stop cannibalism. The next step is to place the larger bass in the prepared growing ponds and to transfer minnows and tadpoles from the rearing ponds into the growing ponds to feed the bass, as required. The next step or steps of my new method is subsequent separating, grading and transferring the bass into size groups in which cannibalism cannot be practiced and placing them in separate growing ponds and continuing to feed them from the food stock raised in the rearing ponds.

The same method steps set forth above for raising bass are employed in the commercial growth and development of edible frogs, except that before transferring the tadpoles from which to produce frogs from the rearing ponds to the growing ponds, they are transferred into metamorphosis ponds where conditions unfavorable for sustaining their life as tadpoles forces them into metamorphosis where they change into frogs, whereupon the frogs are transferred to the growing ponds and maintained, graded and separated so that cannibalism cannot be practiced.

Having described only a typical preferred manner of carrying out the method of my invention I do not wish to be limited or restricted to the specific details herein set forth, but wish to reserve to myself any modifications or variations that may appear to those skilled in the art and fall within the scope of the following claims.

Having described my invention, I claim:

1. The method of raising bass including, first, fertilizing the water in a pond with organic matter to induce and increase the bacteria and diatome count and to induce the growth and colonizing of the waters with Daphnia and midges, then stocking the pond with minnows to live on the Daphnia, then collecting and depositing newly hatched bass into the ponds and letting them feed on the Daphnia and minnows and subsequently grading and separating the mature bass as they grow into size groups where cannibalism cannot be effectuated, and continuing to control fertilization of the pond to maintain a proper oxygen balance, bacteria and diatome count and controlled colonization of Daphnia, midges and minnows on which the bass can feed.

2. The method of raising wild fresh water aquatic food life by providing a pond water habitat having accelerated growth properties, including the steps of determining optimum oxygen content of the pond, stimulating growth of bacteria and diatome life by adding organic fertilizer to said pond water, accelerating the growth and colonization of midges and Daphnia by feeding them on said bacteria and diatome life, stocking the pond with minnows and immature or young aquatic life, grading the resulting mature aquatic food life to size groups to avoid cannibalism, and selectively adding organic fertilizer to said pond water to maintain said optimum oxygen content thereof, whereby a continuous life cycle of the aquatic life is thereby provided for.

3. The method as set forth in claim 2 which further includes, controlling the temperature of the pond water by suitable heater means whereby the vitality and growth of the bacteria and animal life is maintained at optimum.

4. The method as set forth in claim 2 which further includes aerating the water by scrubbing said water with air when the oxygen content thereof drops below optimum as a result of transitory external conditions.

5. The method as set forth in claim 2 which further includes the cultivated growth of algae in said water to provide the water with a source of dissolved oxygen and to maintain said optimum oxygen content thereof.

6. The method as set forth in claim 2 which further includes the provision of rearing pond waters established, fertilized and maintained in accordance with the same method as said pond water habitat, stocking said rearing pond waters with separate and desired newly hatched and young forms of aquatic food life for the separate and controlled raising thereof and selectively transporting said separate aquatic food life from said rearing pond waters to said pond water habitat to stock and maintain said habitat with the desired balance of food life.

7. The method as set forth in claim 2 wherein said wild fresh water aquatic food life includes one or more of, but not limited to, bass, catfish, bullhead, blue gill, sunfish and frogs for human consumption and minnows, crawfish, worms, tadpoles and fingerlings of said food life for consumption as feed for mature food life.

References Cited in the file of this patent

UNITED STATES PATENTS 2,944,513     Keely _____ July 12, 1960

OTHER REFERENCES

Amateur Fish Culture, by Charle E. Walker, pp. 45–48.

Artificial Propagation of Trout, U.S. Commission of Fish and Wildlife, 1900.